United States Patent
Vacchi et al.

(10) Patent No.: US 12,423,459 B2
(45) Date of Patent: Sep. 23, 2025

(54) STRUCTURED ENCRYPTION RULES ENGINE

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 140 days.

(21) Appl. No.: 18/508,857

(22) Filed: Nov. 14, 2023

(65) Prior Publication Data

US 2025/0156575 A1    May 15, 2025

(51) Int. Cl.
*G06F 21/00* (2013.01)
*G06F 21/60* (2013.01)
*G06F 21/62* (2013.01)

(52) U.S. Cl.
CPC ........ *G06F 21/6227* (2013.01); *G06F 21/602* (2013.01)

(58) Field of Classification Search
None
See application file for complete search history.

(56) References Cited

U.S. PATENT DOCUMENTS

2020/0118094 A1*  4/2020  Haldenby ............ G06Q 20/401

FOREIGN PATENT DOCUMENTS

| CN | 202180062 U | * | 4/2012 |
| CN | 112860748 A | * | 5/2021 |
| CN | 115309785 A | * | 11/2022 |
| WO | 2021180062 A1 | | 9/2021 |

* cited by examiner

*Primary Examiner* — Andrew J Steinle
(74) *Attorney, Agent, or Firm* — Dority & Manning, P.A.

(57) ABSTRACT

A rules engine that is running a rules-based application executing on a computing device comprising a processor device receives a first transaction that includes a plurality of data fields, at least some of the data fields including data to be evaluated by a plurality of rules identified in the rules-based application, the first transaction including encrypted data in a first encrypted data field of the plurality of data fields that has been encrypted with a symmetric key in accordance with a structured encrypted algorithm. The rules engine queries the encrypted data using a first query token generated using the symmetric key to determine if the encrypted data includes a value used in a first condition identified in the plurality of rules. The rules engine takes an action based at least in part on querying the encrypted data.

20 Claims, 4 Drawing Sheets

STRUCTURED ENCRYPTION RULES ENGINE

BACKGROUND

A rules engine is a software system that executes a rules-based application made up of a plurality of rules. The rules typically include one or more conditions and an action that is taken based on the outcome of the conditions. Complex rules-based application can include hundreds or even thousands of rules.

SUMMARY

The examples disclosed herein implement a structured encryption rules engine.

In one example a method is provided. The method includes receiving, by a rules engine that is running a rules-based application executing on a computing device comprising a processor device, a first transaction comprising a plurality of data fields, at least some of the data fields comprising data to be evaluated by a plurality of rules identified in the rules-based application, the transaction comprising encrypted data in a first encrypted data field of the plurality of data fields that has been encrypted with a symmetric key in accordance with a structured encrypted algorithm. The method further includes querying, by the rules engine, the encrypted data using a first query token generated using the symmetric key to determine if the encrypted data includes a value used in a first condition identified in the plurality of rules. The method includes taking, by the rules engine, an action based at least in part on querying the encrypted data.

In another example a computing device is provided. The computing device includes a memory and a processor device coupled to the memory to receive, by a rules engine that is running a rules-based application, a first transaction comprising a plurality of data fields, at least some of the data fields comprising data to be evaluated by a plurality of rules identified in the rules-based application, the transaction comprising encrypted data in a first encrypted data field of the plurality of data fields that has been encrypted with a symmetric key in accordance with a structured encrypted algorithm. The processor device is further to query, by the rules engine, the encrypted data using a first query token generated using the symmetric key to determine if the encrypted data includes a value used in a first condition identified in the plurality of rules. The processor device is further to take, by the rules engine, an action based at least in part on querying the encrypted data.

In another example a non-transitory computer-readable storage medium is provided. The non-transitory computer-readable storage medium includes executable instructions to cause a processor device to receive, by a rules engine that is running a rules-based application, a first transaction comprising a plurality of data fields, at least some of the data fields comprising data to be evaluated by a plurality of rules identified in the rules-based application, the transaction comprising encrypted data in a first encrypted data field of the plurality of data fields that has been encrypted with a symmetric key in accordance with a structured encrypted algorithm. The instructions further cause the processor device to query, by the rules engine, the encrypted data using a first query token generated using the symmetric key to determine if the encrypted data includes a value used in a first condition identified in the plurality of rules. The instructions further cause the processor device to take, by the rules engine, an action based at least in part on querying the encrypted data.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A rules engine is a software system that executes a rules-based application made up of a plurality of rules. The rules typically include one or more conditions and an action that is taken based on the outcome of the conditions. Complex rules-based application can include hundreds or even thousands of rules. Many rules engines operate in accordance with the Rete algorithm designed by Dr. Charles Forgy. The Rete algorithm is a pattern matching algorithm for implementing rule-based systems. The algorithm was developed to efficiently apply many rules or patterns to many objects, or facts, in a knowledge base.

A Rete-based rules engine receives as input one or more specifications (e.g., a rules-based application) written in a predetermined syntax that identifies the rules and the relationship between the rules, such as an order of operation of the rules. A complex rules-based engine may implement hundreds or thousands of rules, and many of the rules may be interrelated to one another, such that they share some of the same conditions.

The rules engine typically processes the specification to generate a Rete decision tree (sometimes referred to as a Rete graph, Rete network, or Rete discrimination tree), typically an acyclic directed graph wherein nodes of the graph correspond to conditions or actions and edges between nodes identify execution flow. Many of the nodes in the Rete decision tree correspond to conditions, and an identical condition that is in several different rules may be represented by a single node, vastly increasing the efficiency of determining which rule, if any, a particular transaction meets. A complete rule may be represented by a certain path through the nodes of the Rete decision tree such that if each condition corresponding to a node in the path of nodes is met by an input transaction, an action is taken. The Rete decision tree identifies the paths through the nodes via edges between the nodes.

The rules engine also typically generates processing node segments that correspond to the nodes in the Rete decision tree, and which, when executed by a computing device, implement the corresponding node of the Rete decision tree. Running instances of the processing node segments will be referred to herein as "processing nodes" and at least some of the processing nodes implement conditional statements that operate on data contained in a transaction. Data is introduced into the rules-based application via a transaction that includes data fields that comprise the data. If the data in the transaction meet a condition the transaction is processed by a next processing node. If a transaction reaches the end of the path then the data in the transaction met each condition and an action(s) is taken. The transaction and outcomes of any actions may be stored in a working memory that is accessed by the processing nodes. Rules engines generally process a transaction more quickly than other programming techniques that rely on sequential processing of nested IF-THEN-ELSE statements.

A rules-based application may process transactions that contain sensitive data, such as health information, financial information, or the like. It may be desirable to prevent sensitive data from being accessed or otherwise perceived by the rules-based application, however, it may also be desirable to cause actions to be taken based on such data. While encryption techniques might be used to prevent the sensitive data from being accessed by the rules-based application, encryption would also prevent the rules-based application from taking actions based on the encrypted data.

The examples disclosed herein implement a structured encryption rules engine. The rules engine receives a transaction that includes a plurality of data fields. At least one of the data fields includes encrypted data that has been encrypted with a symmetric key in accordance with a structured encrypted algorithm. The rules engine accesses a query token generated using the symmetric key. The rules engine does not have access to the symmetric key and thus cannot decrypt the encrypted data. The rules engine queries the encrypted data using the query token to determine if the encrypted data includes a value used in a condition identified in the plurality of rules, and takes an action based at least in part on querying the encrypted data. The action may be to stop processing the transaction, to continue processing the transaction, to take a designated action if all the conditions of a rule are met, or the like. The examples disclosed herein allow the encryption of data that is used by a rules-based application without exposing any data that is more than necessary to determine if the data meets a particular condition.

Figure 1:
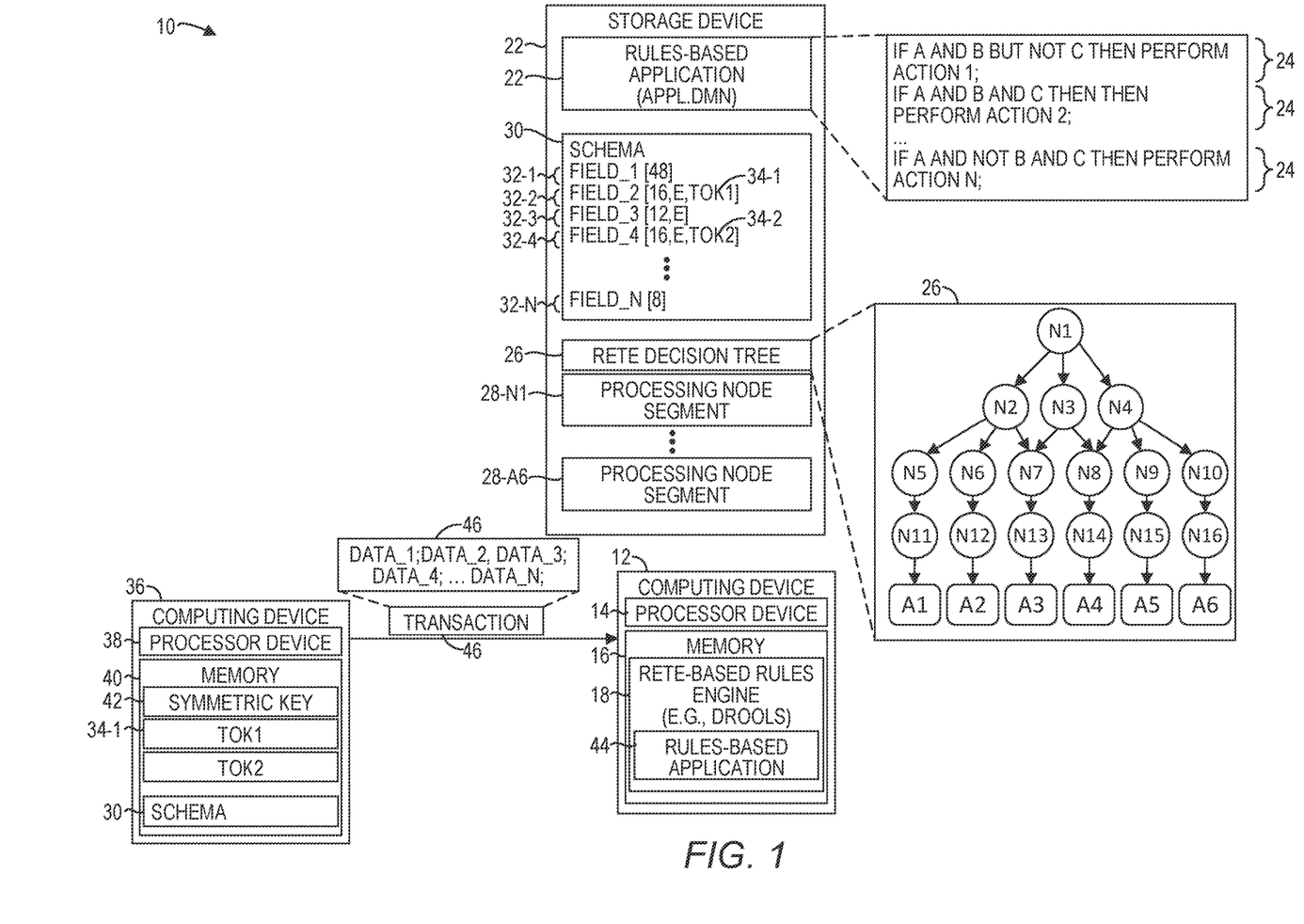
FIG. 1 is a block diagram of an environment in which a structured encryption rules engine can be practiced according to some implementations.

FIG. 1 is a block diagram of an environment 10 in which a structured encryption rules engine can be practiced according to some implementations. The environment 10 includes a computing device 12 that includes a processor device 14 and a memory 16. A structured encryption rules engine 18 (hereinafter "rules engine 18" for the sake of brevity) executes in the memory 16. In some examples the rules engine 18 may be a Rete-based rules engine. The term "Rete-based rules engine" refers to any rules engine that processes one or more specification files that compose (e.g., define) a rules-based application and identify a plurality of conditions and actions taken in response to the conditions, and that organizes the conditions into a Rete network (sometimes referred to as a Rete decision tree) for executing the rules-based application. The examples disclosed herein have applicability to any rules engine, however, in one implementation, the rules engine 18 comprises Drools, available at drools.org, modified as described herein.

The phrase "structured encryption" (STE) refers to a form of encryption wherein a data structure, such as a data item, can be encrypted and yet privately queried. A structured encryption scheme is a symmetric-key encryption scheme that encrypts a data structure in such a way that, given the key K and a query q one can generate a query token qtk with which the encrypted data item can be queried. STE schemes guarantee that no information about the data or queries can be recovered from the encrypted data structure beyond a well-specified and "reasonable" leakage profile. In essence, the encrypted data item can be encrypted in a manner such that, given the appropriate query token, a portion of the encrypted data item can be "leaked" (sometimes referred to as a controlled disclosure). For example, an encrypted data item may contain sensitive information about an individual, such as a name, a medical condition, medications taken by the individual, and also contain information, such as the name of the state in which the individual lives, that is not considered particularly sensitive. The data item is encrypted using a structured encryption algorithm in such a way that, using the symmetric key K used to encrypt the data item and a particular query that, for example, seeks whether a particular word, phrase, or the like is in the encrypted data item, a query token qtk can be generated with which the encrypted data item can be queried to determine if the particular phrase is in the encrypted data item.

As an example, the state in which the individual lives may be in the encrypted data item in the form "State=[state]" such as "State=Florida". It may be relevant to know if the individual lives in the state of Ohio. A query token qtk can be generated that can be used to query the encrypted data item to determine whether the contents of the encrypted data item contains the phrase "State=Ohio" but that can determine nothing else about the encrypted data item.

The computing device 12 includes or is communicatively coupled to a storage device 20 on which a rules-based application 22 is stored. The rules-based application 22 comprises a plurality of rules 24, each of which includes one or more conditions and an action that may be taken based on an evaluation of the one or more conditions, and is written in a specific syntax such as, by way of non-limiting example, decision model and notation (DMN) syntax. While the rules 24 contain, solely for purposes of illustration, relatively simplistic conditions, in practice a rule 24 may contain any number of conditions and combination of logical operators, and any number of actions can be taken based on an evaluation of the rule 24.

The rules engine 18 generates, based on the rules-based application 22, a Rete decision tree 26 that identifies nodes N1-N16 and A1-A6. The nodes N1-N16 correspond to conditions identified in the rules 24 and arrows (e.g., edges) extending from one node N1-N16 to another node N1-N16 identify a particular combination of conditions associated with one or more rules. The nodes A1-A6 correspond to different actions that will be taken if the conditional evaluations lead to that particular node A1-A6. The rules engine 18, based on the rules-based application 22, generates a plurality of processing node segments 28-N1-28-A6 (generally, processing node segments 28) that correspond to the nodes N1-N16 and A1-A6 and that comprise executable instructions that, when executed on a computing device, implement the logic of the corresponding node N1-N16 and A1-A6. For example the processing node segment 28-N1 may correspond to the node N1.

As an example of how the rules-based application 22, when executed by the rules engine 18, implements a rule 24, if a particular transaction that is inserted at the node N1 contains data that causes the conditional evaluations along the path of the subset of nodes N1, N2, N5 and N11 to each be true, then the node A1 will implement a particular action. If the transaction data that causes the conditional evaluations along the path of the subset of nodes N1, N2, N6 and N12 to each be true, then the node A2 will implement a particular action.

The rules-based application 22 expects a transaction having certain data to be provided to the rules-based application 22 so that the transaction can be evaluated in accordance with the rules 24 and if appropriate, certain actions can be taken. The storage device 20 includes a schema 30 that identifies the format that a transaction submitted to the rules-based application 22 will have. The schema 30 identifies a plurality of data fields 32-1-32-N (generally, data fields 32). The term "data field" as used herein refers to a particular portion of a transaction. The term "data" or "data item" refers to the content of that data field 32. A data field 32 that contains encrypted data may be referred to herein as an encrypted data field 32. The data fields 32 of each transaction are identical, but the data in the data fields 32 may differ for each transaction.

The data field 32-1 is a 48 byte data field that is not encrypted. The data field 32-2 is a 16 byte data field that is encrypted, indicated by the letter "E". As will be described in greater detail below, a query token 34-1 can be used to determine if the contents of the encrypted data in the data field 32-2 contains a particular value or pattern. The data field 32-3 is a 12 byte data field that is encrypted, and for which there is no query token. The data field 32-4 is a 16 byte data field that is encrypted, and a query token 34-2 can be used to determine if the contents of the encrypted data in the data field 32-4 contains a particular value or pattern. The data field 32-N is an 8 byte data field that is not encrypted.

The environment 10 includes a computing device 36 that includes a processing device 38 and a memory 40. The computing device 36 will use a symmetric key 42 to encrypt data in a transaction submitted to the computing device 12 for processing by the rules engine 18 when executing the rules-based application 22. The computing device 36 utilizes the symmetric key 42 and the particular query associated with the rule 24 to generate the query token 34-1 to allow the rule 24 that utilizes the data field 32-2 to determine whether the encrypted data in the data field 32-2 of a transaction contains a certain pattern or value. The computing device 36 utilizes the symmetric key 42 and the particular query associated with the rule 24 that utilizes the data field 32-4 to generate the query token 34-2 to allow the rule 24 to determine whether the encrypted data in the data field 32-4 of a transaction contains a certain pattern or value. The computing device 36 provides the schema 30, including the query tokens 34-1 and 34-2 to the computing device 12 for storing in the storage device 20. The computing device 36 does not provide the symmetric key 42 to the computing device 12, and the computing device 12 does not otherwise have access to the symmetric key 42, and thus cannot decrypt any of the encrypted data of a transaction.

The rules engine 18 executes the rules-based application 22 as a runtime rules-based application 44. Because the rules engine 18 facilitates the execution of the runtime rules-based application 44, functionality implemented by the rules-based application 44 may be attributed to the rules engine 18. In some implementations, the runtime rules-based application 44 may comprise processing nodes that correspond to the processing node segments 28.

The computing device 36 generates a transaction 46 that includes data (e.g., DATA_1, DATA_2, etc.) as described in the schema 30. The computing device 36 encrypts the data in the data fields 32-2, 32-3 and 32-4 using the symmetric key 42. The computing device 36 sends the transaction 46 to the computing device 12 for submission to the rules engine 18.

The rules engine 18 receives the transaction 46 and processes the transaction 46 in accordance with the logic of the rules 24. The rules engine 18 may access the schema 30 to determine that the encrypted data fields 32-2 and 32-4 are encrypted data fields and to obtain the query tokens 34-1 and 34-2. The rules engine 18 accesses the query token 34-1 and queries the encrypted data contained in the data field 32-2 to determine if the encrypted data includes a particular pattern, such as a particular alphanumeric value, that is used in a condition of a rule 24. The response to the query causes a condition to evaluate to true or false in accordance with the logic of the rules 24 and the rules engine 18 takes some action, such as, for example, to continue to process the transaction 46, to stop processing the transaction 46, to perform an action identified in a rule 24, or the like. The rules engine 18 accesses the query token 34-2 and queries the encrypted data contained in the data field 32-4 to determine if the encrypted data includes a particular pattern. Again, the response to the query causes a condition to evaluate to true or false in accordance with the logic of the rules 24 and the rules engine 18 takes some action, such as, for example, to continue to process the transaction 46, to stop processing the transaction 46, to perform an action identified in a rule 24.

The rules engine 18 is unable to access the contents of the data fields 32-2 and 32-4 other than that subset of information (e.g., the "leakage" or "controlled disclosure") permitted via use of the query tokens 34-1 and 34-2, respectively. The rules engine 18 is unable to interpret (e.g., access) the contents of the data field 32-3 at all, and thus the data in the data field 32-3 is not the subject of any of the conditions in the rules 24.

The computing device 36 may subsequently generate a second transaction that includes data (e.g., DATA_1, DATA_2, etc.) as described in the schema 30, but that is different data from the data in the transaction. The computing device 36 encrypts the data in the data fields 32-2, 32-3 and 32-4 using the symmetric key 42. The computing device 36 sends the transaction to the computing device 12 for submission to the rules engine 18.

The rules engine 18 receives the transaction and processes the transaction in accordance with the logic of the rules 24. The rules engine 18 again accesses the query token 34-1 and queries the encrypted data contained in the data field 32-2 to determine if the encrypted data includes a particular pattern, such as a particular alphanumeric value. The response to the query causes a condition to evaluate to true or false in accordance with the logic of the rules 24 and the rules engine 18 takes some action. The rules engine 18 accesses the query token 34-2 and queries the encrypted data contained in the data field 32-4 to determine if the encrypted data includes a particular pattern. Again, the response to the query causes a condition to evaluate to true or false in accordance with the logic of the rules 24 and the rules engine 18 takes some action.

In this manner, sensitive data can be processed by a rules-based application and the privacy of the data maintained outside of a carefully determined "leakage" sufficient to allow the rules-based application to act on the encrypted data.

It is noted that, because the rules engine 18 is a component of the computing device 12, functionality implemented by the rules engine 18 may be attributed to the computing device 12 generally. Moreover, in examples where the rules engine 18 comprises software instructions that program the processor device 14 to carry out functionality discussed herein, functionality implemented by the rules engine 18 may be attributed herein to the processor device 14.

Figure 2:
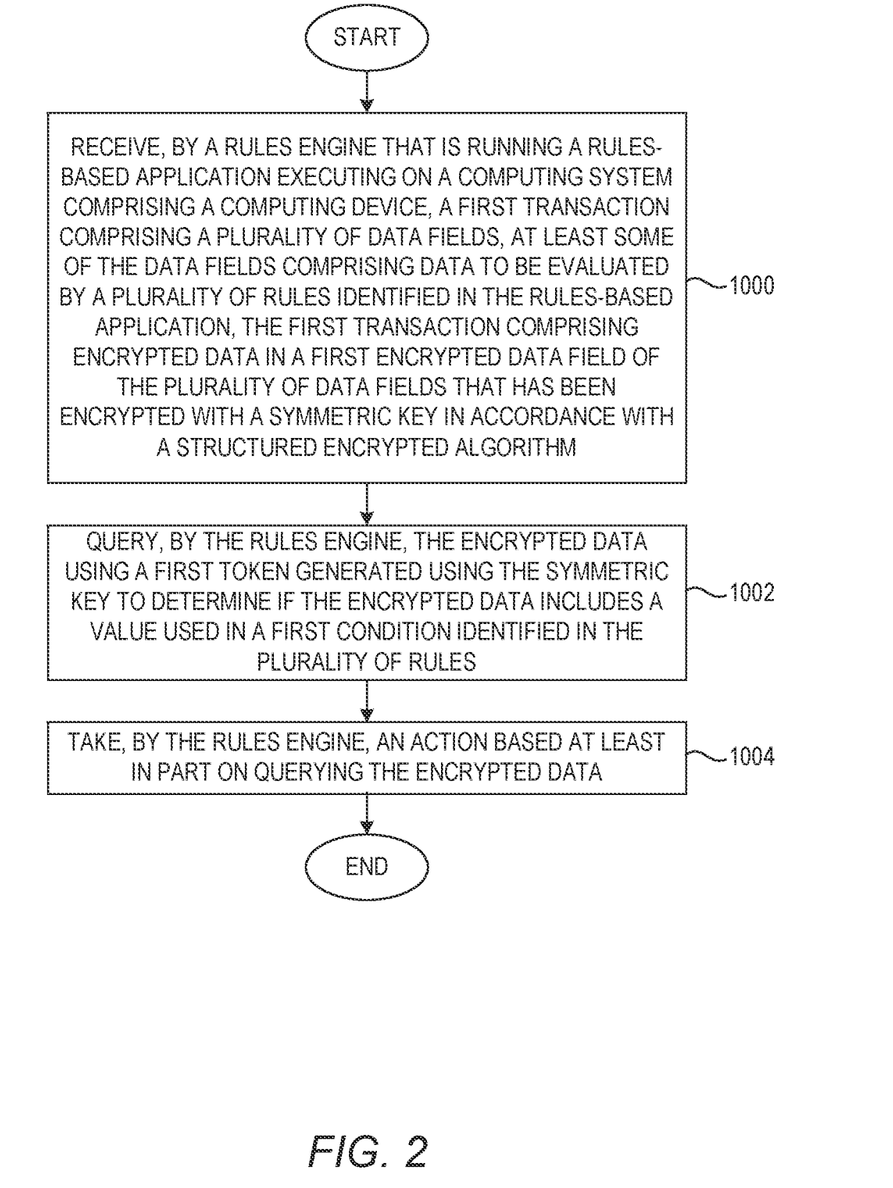
FIG. 2 is a flowchart of a method for using a structured encryption rules engine according to some implementations.

FIG. 2 is a flowchart of a method for using a structured encryption rules engine according to some implementations. FIG. 2 will be discussed in conjunction with FIG. 1. The rules engine 18 that is running the rules-based application 44 executing on the computing device 12 receives the transaction 46 comprising the plurality of data fields 32, at least some of the data fields 32 comprising data to be evaluated by the plurality of rules 24 identified in the rules-based application 22, the transaction 46 comprising encrypted data in the encrypted data field 32-2 of the plurality of data fields 32 that has been encrypted with the symmetric key 42 in accordance with a structured encrypted algorithm (FIG. 2, block 1000). The rules engine queries the encrypted data using the query token 34-1 generated using the symmetric key 42 to determine if the encrypted data includes a value used in a condition identified in the plurality of rules 24 (FIG. 2, block 1002). The rules engine 18 takes an action based at least in part on querying the encrypted data (FIG. 2, block 1004).

Figure 3:
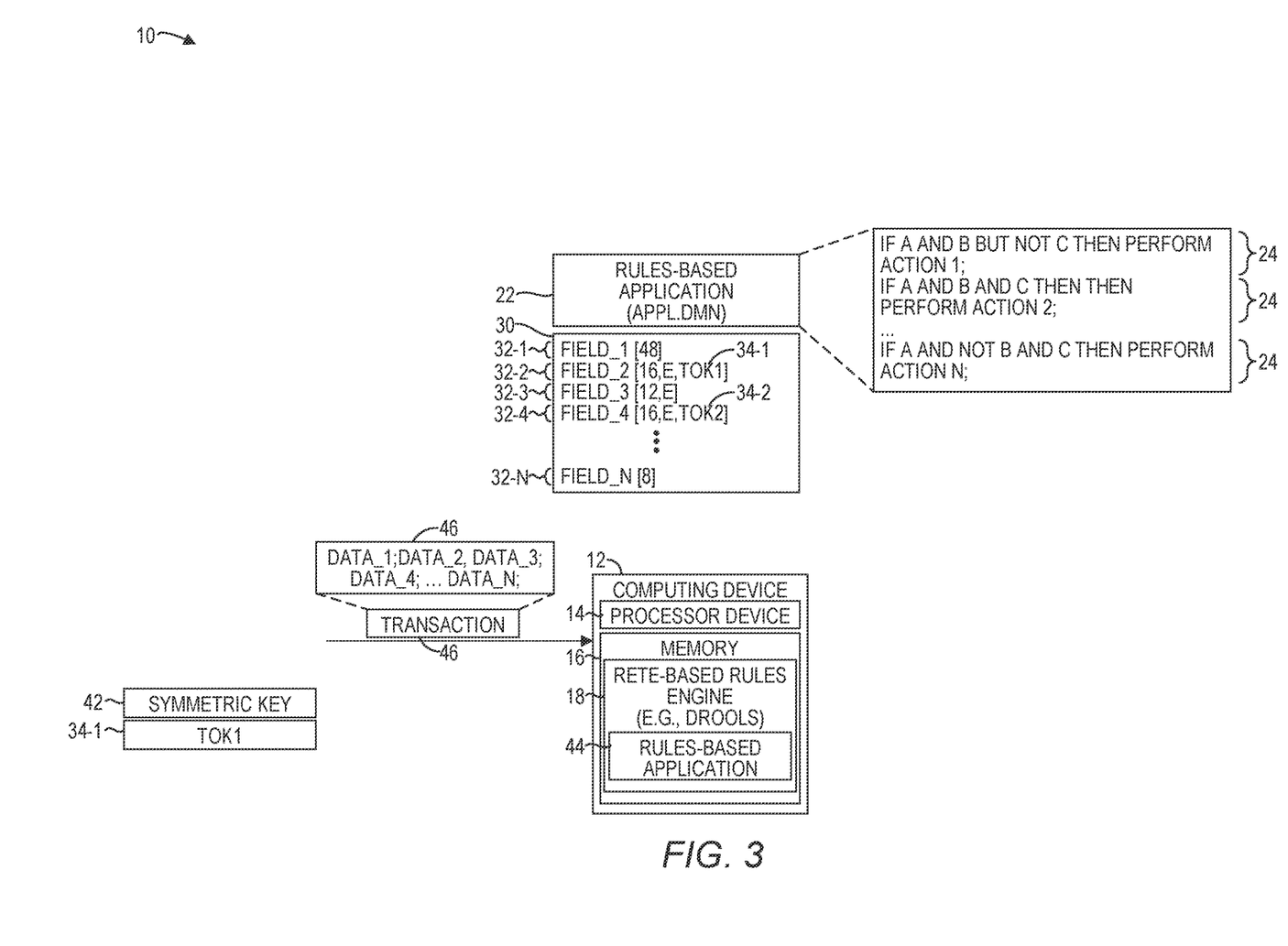
FIG. 3 is a simplified block diagram of the environment illustrated in FIG. 1 according to one implementation.

FIG. 3 is a simplified block diagram of the environment 10 illustrated in FIG. 1 according to one implementation. The environment 10 includes the computing device 12, which in turn includes the memory 16 and the processor device 14 coupled to the memory 16. The processor device 14 is to receive, by the rules engine 18 that is running the rules-based application 44, the transaction 46 comprising the plurality of data fields 32, at least some of the data fields 32 comprising data to be evaluated by the plurality of rules 24 identified in the rules-based application 22, the transaction 46 comprising encrypted data in a encrypted data field 32 of the plurality of data fields 32 that has been encrypted with the symmetric key 42 in accordance with a structured encrypted algorithm. The processor device 14 is further to query, by the rules engine 18, the encrypted data using the query token 34-1 generated using the symmetric key 42 to determine if the encrypted data includes a value used in a condition identified in the plurality of rules 24. The processor device 14 is further to take, by the rules engine 18, an action based at least in part on querying the encrypted data.

Figure 4:
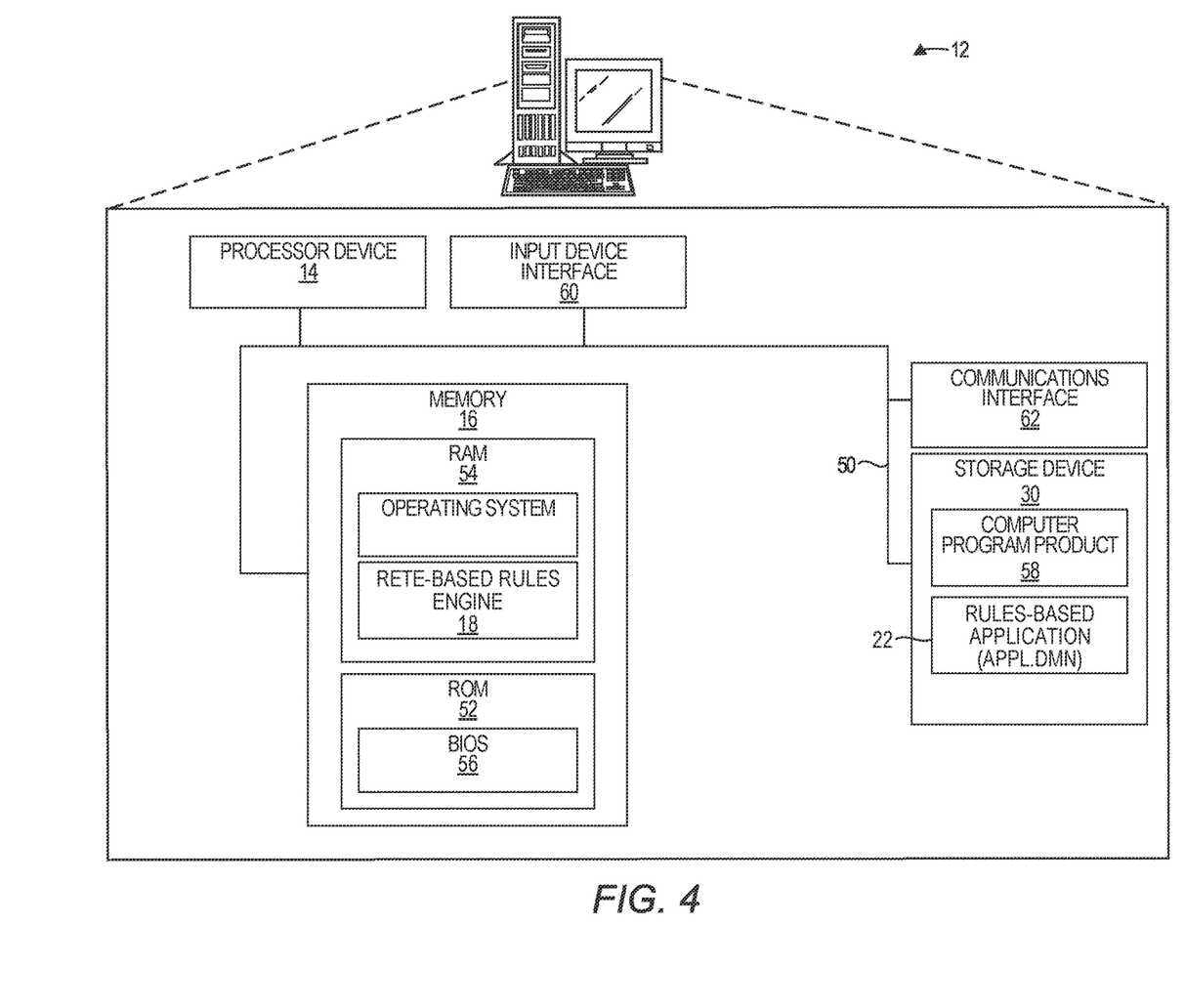
FIG. 4 is a block diagram of a computing device suitable for implementing a structured encryption rules engine according to some examples.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 50. The system bus 50 provides an interface for system components including, but not limited to, the system memory 16 and the processor device 14. The processor device 14 can be any commercially available or proprietary processor device.

The system bus 50 may be any of several types of bus structures that may further interconnect to a memory bus (with or without a memory controller), a peripheral bus, and/or a local bus using any of a variety of commercially available bus architectures. The system memory 16 may include non-volatile memory 52 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 52 and can include the basic routines that help to transfer information between elements within the computing device 12. The volatile memory 54 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 54, including an operating system and one or more program modules, such as the rules engine 18, which may implement the functionality described herein in whole or in part. All or a portion of the examples may be implemented as a computer program product 58 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the rules engine 18 in the volatile memory 54, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 60 that is coupled to the system bus 50 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 62 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a rules engine that is running a rules-based application executing on a computing device comprising a processor device, a first transaction comprising a plurality of data fields, at least some of the data fields comprising data to be evaluated by a plurality of rules identified in the rules-based application, the first transaction comprising encrypted data in a first encrypted data field of the plurality of data fields that has been encrypted with a symmetric key in accordance with a structured encrypted algorithm;
   querying, by the rules engine, the encrypted data using a first query token generated using the symmetric key to determine if the encrypted data includes a value used in a first condition identified in the plurality of rules; and
   taking, by the rules engine, an action based at least in part on querying the encrypted data.

2. The method of claim 1, further comprising:
   accessing, by the rules engine, a schema that identifies the plurality of data fields of the first transaction including the first encrypted data field; and
   determining, based on the schema, that the first encrypted data field is an encrypted data field.

3. The method of claim 2, further comprising:
   prior to querying the encrypted data, obtaining, by the rules engine, the first query token from the schema.

4. The method of claim 1, wherein the rules engine does not have access to the symmetric key.

5. The method of claim 1, wherein the rules engine is a Rete-based rules engine.

6. The method of claim 5, further comprising generating, by the rules engine, a Rete decision tree from the rules-based application, the Rete decision tree identifying a plurality of nodes that correspond to a plurality of conditions identified in the plurality of rules and identifying a plurality of paths through subsets of the nodes in accordance with logic of the rules-based application.

7. The method of claim 1, further comprising:
   accessing, by the rules engine, a second query token generated using the symmetric key, the second query token differing from the first query token;
   querying, by the rules engine, encrypted data in a second encrypted data field of the plurality of data fields using the second query token to determine if the encrypted data in the second encrypted data field includes a value used in a second condition identified in the plurality of rules; and
   taking, by the rules engine, the action based at least in part on querying the encrypted data in the first encrypted data field and the encrypted data in the second encrypted data field.

8. The method of claim 1 wherein a second data field of the plurality of data fields comprises unencrypted data.

9. The method of claim 1 further comprising:
   receiving, by the rules engine, a second transaction comprising the plurality of data fields;
   accessing, by the rules engine, the first query token generated using the symmetric key;
   querying, by the rules engine, encrypted data in the first encrypted data field of the second transaction using the first query token to determine if the encrypted data in the first encrypted data field of the second transaction includes a value used in the first condition identified in the plurality of rules, the encrypted data in the first encrypted data field of the second transaction being different from the encrypted data in the first encrypted data field of the first transaction; and
   taking, by the rules engine, an action based at least in part on querying the encrypted data in the first encrypted data field of the second transaction.

10. A computing device, comprising:
    a memory; and
    a processor device coupled to the memory to:
    receive, by a rules engine that is running a rules-based application, a first transaction comprising a plurality of data fields, at least some of the data fields comprising data to be evaluated by a plurality of rules identified in the rules-based application, the first transaction comprising encrypted data in a first encrypted data field of the plurality of data fields that has been encrypted with a symmetric key in accordance with a structured encrypted algorithm;
    query, by the rules engine, the encrypted data using a first query token generated using the symmetric key to determine if the encrypted data includes a value used in a first condition identified in the plurality of rules; and
    take, by the rules engine, an action based at least in part on querying the encrypted data.

11. The computing device of claim 10, wherein the processor device is further to:
    access, by the rules engine, a schema that identifies the plurality of data fields of the first transaction including the first encrypted data field; and
    determine, based on the schema, that the first encrypted data field is an encrypted data field.

12. The computing device of claim 10, wherein the rules engine does not have access to the symmetric key.

13. The computing device of claim 10, wherein the processor device is further to:
    access, by the rules engine, a second query token generated using the symmetric key, the second query token differing from the first query token;
    query, by the rules engine, encrypted data in a second encrypted data field of the plurality of data fields using the second query token to determine if the encrypted data in the second encrypted data field includes a value used in a second condition identified in the plurality of rules; and
    take, by the rules engine, the action based at least in part on querying the encrypted data in the first encrypted data field and the encrypted data in the second encrypted data field.

14. The computing device of claim 10, wherein a second data field of the plurality of data fields comprises unencrypted data.

15. The computing device of claim 10, wherein the processor device is further to:

receive, by the rules engine, a second transaction comprising the plurality of data fields;

access, by the rules engine, the first query token generated using the symmetric key;

query, by the rules engine, encrypted data in the first encrypted data field of the second transaction using the first query token to determine if the encrypted data in the first encrypted data field of the second transaction includes a value used in the first condition identified in the plurality of rules, the encrypted data in the first encrypted data field of the second transaction being different from the encrypted data in the first encrypted data field of the first transaction; and take, by the rules engine, an action based at least in part on querying the encrypted data in the first encrypted data field of the second transaction.

16. A non-transitory computer-readable storage medium that includes executable instructions to cause a processor device to:

receive, by a rules engine that is running a rules-based application, a first transaction comprising a plurality of data fields, at least some of the data fields comprising data to be evaluated by a plurality of rules identified in the rules-based application, the first transaction comprising encrypted data in a first encrypted data field of the plurality of data fields that has been encrypted with a symmetric key in accordance with a structured encrypted algorithm;

query, by the rules engine, the encrypted data using a first query token generated using the symmetric key to determine if the encrypted data includes a value used in a first condition identified in the plurality of rules; and take, by the rules engine, an action based at least in part on querying the encrypted data.

17. The non-transitory computer-readable storage medium of claim 16, wherein the instructions further cause the processor device to:

access, by the rules engine, a schema that identifies the plurality of data fields of the first transaction including the first encrypted data field; and determine, based on the schema, that the first encrypted data field is an encrypted data field.

18. The non-transitory computer-readable storage medium of claim 16, wherein the instructions further cause the processor device to:

access, by the rules engine, a second query token generated using the symmetric key, the second query token differing from the first query token;

query, by the rules engine, encrypted data in a second encrypted data field of the plurality of data fields using the second query token to determine if the encrypted data in the second encrypted data field includes a value used in a second condition identified in the plurality of rules; and take, by the rules engine, the action based at least in part on querying the encrypted data in the first encrypted data field and the encrypted data in the second encrypted data field.

19. The non-transitory computer-readable storage medium of claim 16, wherein a second data field of the plurality of data fields comprises unencrypted data.

20. The non-transitory computer-readable storage medium of claim 16, wherein the instructions further cause the processor device to:

receive, by the rules engine, a second transaction comprising the plurality of data fields;

access, by the rules engine, the first query token generated using the symmetric key;

query, by the rules engine, encrypted data in the first encrypted data field of the second transaction using the first query token to determine if the encrypted data in the first encrypted data field of the second transaction includes a value used in the first condition identified in the plurality of rules, the encrypted data in the first encrypted data field of the second transaction being different from the encrypted data in the first encrypted data field of the first transaction; and take, by the rules engine, an action based at least in part on querying the encrypted data in the first encrypted data field of the second transaction.

* * * * *